Figure 1:
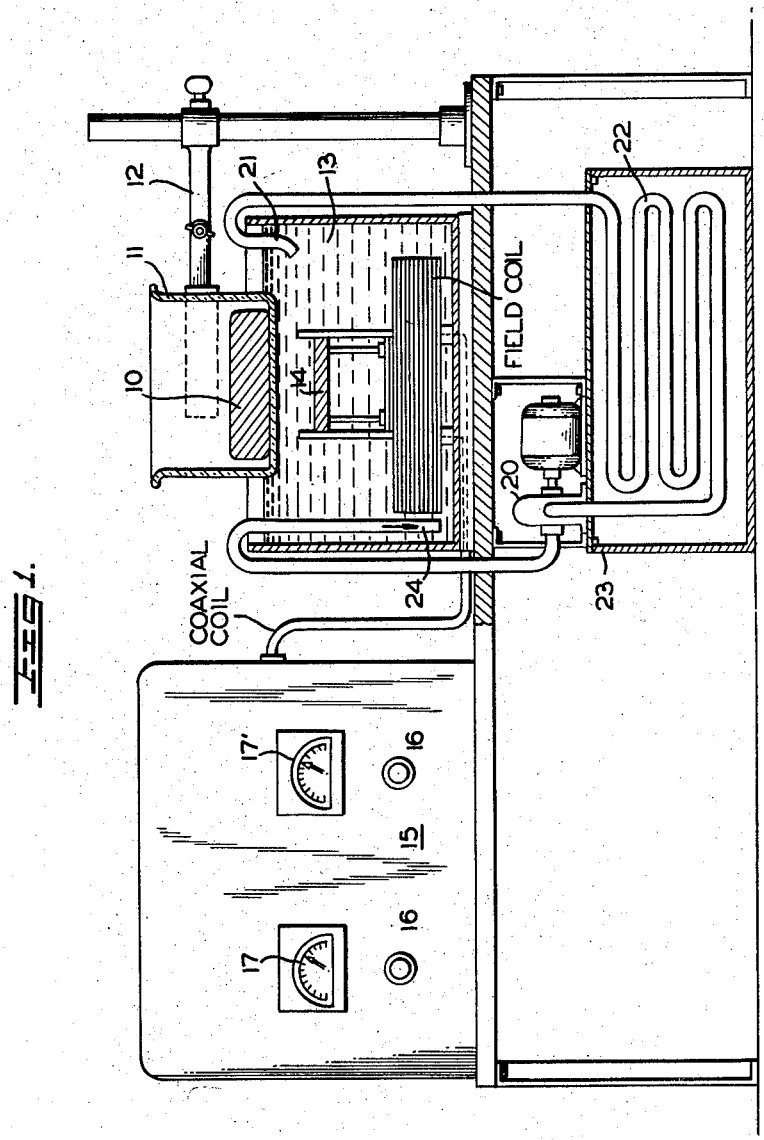

April 14, 1959 — W. C. WINDER ET AL — 2,882,164
METHOD FOR RIPENING CHEESE
Filed May 1, 1956 — 2 Sheets-Sheet 1

INVENTOR.
WILLIAM C. WINDER
ARTHUR M. SWANSON
BY
Adams Forward & McLean
ATTORNEYS

VARIABLE BACTERIA COUNT OF UNTREATED AND TREATED CHEDDAR CHEESE

INVENTOR.
WILLIAM C. WINDER
ARTHUR M. SWANSON
BY
*Adams Forward & McLean*
ATTORNEYS

United States Patent Office 2,882,164
Patented Apr. 14, 1959

2,882,164

METHOD FOR RIPENING CHEESE

William C. Winder and Arthur M. Swanson, Madison, Wis., assignors to Wisconsin Alumni Research Foundation, Madison, Wis., a corporation of Wisconsin Application May 1, 1956, Serial No. 581,914

11 Claims. (Cl. 99—116)

The present invention relates to the manufacture of cheese, and more specifically to an improved method of ripening cheese.

In the manufacture of cheese from cheese curd, it has been found necessary in order to develop the desired body and flavor, to store the cheese curd under controlled temperature conditions for considerable periods of time, e.g. three months and preferably nine months to one year or more. During these periods, known in the art as ripening, curing or aging periods, the cheese passes through a series of complex physical and chemical changes. Cheddar cheese, for example, undergoes a series of physical and chemical changes during ripening which cause the body of the cheese to lose its somewhat tough, elastic and rubber-like properties and to become waxy in texture as distinguished from rubber-like, and relatively soft and mellow. The chemical changes which take place on ripening are extremely complex and not fully understood. They involve both bacteria and enzyme action with resulting proteolysis or protein degradation into amino acid type complexes as evidenced by the large increase in water-soluble nitrogen and non-protein nitrogen in cheese during the ripening period. The decomposition or breakdown of the proteins in the curd is an important factor in providing the cheese with the desired body and "aged" cheese flavor.

The storage of cheese during the ripening period has posed serious problems in the cheese industry for many years. One of the principal problems has been the expense involved. In commercial operations, for example, storage costs have been found to run around 3/8 to 1/2 cent per pound of cheese per month. The amount of the overall storage cost per month will be apparent when it is realized that the State of Wisconsin alone, normally has in storage over 70 million pounds of Cheddar cheese in the ripening stage. The necessity for relatively long ripening periods also necessitates the keeping of relatively large inventories which results in the tying up of large sums of money and which may result in substantial financial loss in a dropping cheese market. Another problem encountered in storage is the shrinkage or weight loss of the cheese. This results in a substantial loss in poundage when the cheese is stored for relatively long periods of time. Other problems which increase as the ripening periods increase are the tendency of the cheese to become contaminated with mold as well as the tendency of the cheese to develop what is known in the art as off flavors. The off flavor problem becomes particularly critical where unpasteurized milk or cream (which are preferred over pasteurized products for making certain types of aged cheese) are employed.

In view of the above, the cheese industry has been attempting for many years to develop improved methods for ripening cheese. These have been directed for the most part to attempts to reduce the time of the ripening period by force curing at elevated temperatures. While the higher temperatures have been found to increase the rate of ripening, their use up to the present time has failed to provide a cheese with a body and flavor comparable to cheese ripened at lower temperatures for longer periods of time. Cheddar cheese force cured at 50–60° F. for three months, for example, does not have the desired body and flavor of Cheddar cheese cold cured at 34–35° F. for 9–12 months. The use of high temperatures around 60° F. has also been found generally unsatisfactory as certain types of cheese tend to "oil off," i.e. lose fat, when cured at high temperatures. In addition, the use of high temperatures has been found to activate unwanted gas-producing organisms along with organisms which give the cheese an off flavor. At the lower ripening temperatures the growth of organisms producing gas and taints in cheese is decreased and in certain cases practically suspended.

The principal object of the present invention is to provide an improved method for ripening cheese.

Another object of the present invention is to provide ripe cheese with the desired body and flavor by an improved ripening method requiring materially shorter ripening periods than employed heretofore.

Other objects of the present invention will be apparent as the description proceeds hereinafter.

We discovered after a detailed research investigation that compressional waves produce unique effects in cheese. We also discovered that the ripening of cheese is accelerated when cheese curd, including fresh curd suspended in whey, green curd in finished form for ripening, as well as partially ripened curd, is subjected to compressional waves so that the energy going into the curd is at least about 0.05 watt hour per pound of curd. While particularly applicable for use in the manufacture of natural cheese, the invention may be advantageously used in the treatment of filled cheese, processed cheese, cheese foods and the like as shown below.

The compressional waves used in the method of the present invention may be generated by various types of compressional wave apparatus. Illustrative examples are described in U.S. Patent No. 1,734,975 which employs a piezoelectric crystal, and in U.S. Patent No. 2,170,178 which employs a vibratory apparatus of the magneto strictor type. The compressional waves may be of various frequencies including waves in the audible (e.g. 100 cycles per second to 18,000 cycles per second) range, although it is generally preferred to operate at frequencies in the inaudible or ultrasonic range above 18,000 cycles and preferably at frequencies of about 200,000 to 1,000,000 cycles per second. Representative ranges in cycles per second are about 100 to 50,000, using a magnetostriction device and about 50,000 to 100,000,000 using a piezoelectric device. The time of the treatment with the compressional waves may also be varied although a treatment of at least about ten seconds and not more than one hour, with about 15 seconds to about a minute or several minutes, e.g. about 1 to 5 minutes, are indicated and are generally preferred. The optimum times may vary with the energy going into the curd as well as with the frequency of the compressional waves employed. The optimum overall treatment also may vary with the particular curd or cheese undergoing treatment. In all cases, however, optimum conditions, including frequency, time, temperature, energy transfer, etc., for carrying out the process may be readily ascertained by preliminary test.

The cheese may be treated by placing it in direct contact with the crystal or transducer, or the compressional waves may be transmitted to the cheese through gas, e.g. air, through liquids such as water, mineral oil and the like, or through solids such as metal or plastic diaphragms, etc. The direct contact with the curd positioned against one side or both sides of the transducer or a multiple of transducers, or resting directly on the bottom of the treatment cell and surrounded by air instead of being immersed in liquids such as water or tasteless mineral oil, is usually more effective and is generally preferred except when treating curd suspended in whey. An illustrative apparatus shown in the accompanying drawing and described in detail below, employs transformer oil as the transmission medium for the sound waves to the treatment cell. For maximum transmission of the sound energy to the cheese curd, it is necessary to have the curd in direct contact with the transducer, or, when a cell is used, to have the bottom of the treatment cell or container positioned so that it will minimize the reflection of the sound waves. The quantity of energy going into the curd or cheese can be from about 0.05–25 watt hours per pound of curd or cheese. Below 0.05 watt hour per pound of curd or cheese produces little beneficial effects and above 25 watt hours per pound of curd or cheese produces no appreciable additional beneficial effects. About 0.1–1.0 watt hours per pound of curd or cheese has given good results of the type desired.

Figure 2:
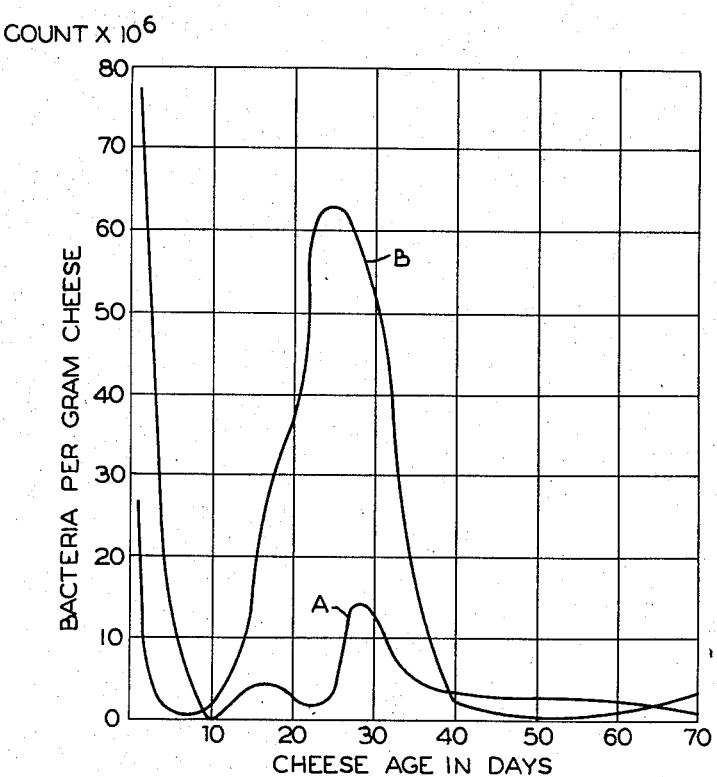

In the drawings:

Figure 1 is a schematic view partially in section illustrating one apparatus by which the method of the invention may be practiced; and Figure 2 is a graphic representation showing the relationship between bacterial growth in untreated controls and cheese treated in accordance with the method of the invention.

The mechanisms by which the compressional waves accelerate the rate of ripening of the cheese is not fully understood, although investigations indicate that it is due to a combination of various factors and that physical and chemical actions are involved, along with microbiological activity. The compressional waves, for example, break some of the long chain protein aggregates, thus beginning protein degradation which is essential in the ripening process. The waves also affect the bacterial flora in the complex cheese mixture so that protein degradation or body breakdown is much more rapid for treated cheese then for cheese which has not been subjected to compressional waves. Investigations in this connection have also demonstrated that the present invention not only provides for greater body breakdown for a given period but also provides for direct or indirect degradation into desired less complex compounds such as glutamic acid and leucine, the presence of which in high levels is associated with an increase in desired cheese flavor. The following table of "Apparent free amino acids" in treated and untreated cheese will serve for illustrative purposes.

TABLE I

"Apparent free" amino acids in cheese

| Amino Acid | Mg. Amino Acid/10 grams Cheese Solids | | | |
| --- | --- | --- | --- | --- |
| | Treated Lot No. 1 | Control | Treated Lot No. 2 | Control |
| Glutamic Acid | 56 | 40 | 53 | 33 |
| Leucine | 60 | 32 | 60 | 25 |
| Valine | 30 | 21 | 25 | 20 |
| Isoleucine | 8.5 | 8 | 8.3 | 7.5 |
| Lysine | 37 | 31 | 32 | 27.5 |
| Methionine | 10 | 7 | 8 | 7.5 |
| Histidine | 11.7 | 10 | 11 | 7.5 |
| Glycine | 7.5 | 7 | 9 | 5 |
| Arginine | 9 | 12 | 7.5 | 10.5 |
| Phenylalanine | 17.5 | 25 | 10.5 | 18 |

In the table the Treated No. 1 Cheddar cheese and Treated No. 2 Cheddar cheese were subjected to compressional waves having a frequency of about 400 kilocycles for 10 and 20 minutes, respectively, and then stored with the untreated cheese or controls for six weeks. It will be noted that the apparent free glutamic acid for the treated cheeses runs about 40–60 percent above that of the controls and that the apparent free leucine for the treated cheeses runs about 100 percent above that of the controls. Tests have also demonstrated that the concentrations of glutamic acid and leucine in six weeks' old Cheddar cheese treated in accordance with the present invention actually equaled or exceeded their concentrations in untreated 31 weeks' old Cheddar cheese, and as pointed out above, high levels of these two amino acids are known in the art to always be accompanied by greater cheese flavor. Harper, W. J. "The Measurement and Significance of Amino Acids in Cheddar Cheese During Ripening" Ph. D. thesis, University of Wisconsin, June 1949.

The method employed in determining the "apparent free" amino acids is discussed in detail in Harper, supra. The term "apparent free" amino acid is used because the method measures the free amino acids plus any combination of amino acids in peptide linkage which react in the test.

Investigations have also demonstrated that the compressional waves kill certain types of bacteria present in the cheese and that this results in the massive release of endoenzymes which act on the cheese earlier than if released only on the natural death of the organisms. In addition to the liberation of large numbers of enzymes due to the killing of the bacteria and regrowth and death of new bacteria, investigations indicate that the enzymes present at the time of the treatment, are not inactivated by the compressional waves. While enzyme activity is a contributing factor to the increased rate of ripening, the overall effect of the compressional waves on the bacteria is not wholly understood. Experiments, for example, have shown treated cheese to contain considerably more (in certain instances over 400 percent more) bacteria when stored for a few weeks than the untreated controls stored for a like period under similar conditions.

A graphic representation showing the effect on the bacterial flora in Cheddar cheese treated with compressional waves (400 kilocycles for 15 minutes in accordance with the procedure set forth in Example I below) is given in Figure 2. The bacterial counts were made just prior to the compressional wave treatment on all samples to insure that the control samples were comparable in bacterial flora to the samples to be treated. Immediately following the treatment bacterial counts were made again and each cheese was then paraffined and placed in the curing room at 40° F. Every three days thereafter for a period of 69 days bacterial counts were made on each sample of cheese in accordance with the procedure of Foster, E. M. and Frazier, W. C., Laboratory Manual for Dairy Bacteriology, Department of Agricultural Bacteriology, University of Wisconsin (1946). The curve A which gives the viable count of bacteria for the untreated control shows that the bacteria are at their maximum during the first few days, that they decrease rather rapidly, that they start to increase slowly after about ten days and reach a minor peak of about $15 \times 10^6$ per gram between the 25th and 30th days and then gradually decrease and level off to about 1,000,000 bacteria per gram with further aging. Curve B which gives the viable count of bacteria for the treated cheese shows that about two-thirds of the bacteria did not survive the treatment with compressional waves, that they decrease rather rapidly, that they start to increase rapidly after about a week and reach a high peak of about $62 \times 10^6$ per gram at about the 25th day, when they decrease again and level off with further aging.

Samples of the control and treated cheese used in making the bacterial counts shown in Figure 2 were also examined microscopically on about every sixth day to determine the types of bacteria present. The results are given in Table II.

TABLE II

| Cheese age (days) | Percent of Bacterial Types | | | | | |
|---|---|---|---|---|---|---|
| | Control | | | Treated | | |
| | M | S | L | M | S | L |
| 7 | 0 | 100 | 0 | 0 | 100 | 0 |
| 13 | 0 | 100 | 0 | 40 | 60 | 0 |
| 19 | 0 | 100 | 0 | 70 | 30 | 0 |
| 25 | 10 | 90 | 0 | 60 | 40 | 0 |
| 31 | 30 | 70 | 0 | 80 | 20 | 0 |
| 37 | 15 | 85 | 0 | 70 | 20 | 10 |
| 43 | 10 | 90 | 0 | 30 | 10 | 60 |
| 49 | 20 | 80 | 0 | 20 | 20 | 60 |
| 55 | 15 | 85 | 0 | 30 | 0 | 70 |
| 61 | 10 | 90 | 0 | 50 | 0 | 50 |
| 67 | 20 | 80 | 0 | 30 | 0 | 70 |

M=micrococci; S=streptococci; L=lactobacilli.

With the control, these tests show that the original viable bacteria present were streptococci, that the micrococci did not appear and then only in relatively small numbers until about the 25th day, and that the lactobacilli did not make an appearance during the period of the tests. With the treated cheese, these tests show that the original viable bacteria present were also streptococci, that the micrococci appeared in large numbers on about the 13th day and that the lactobacilli made an appearance on about the 37th day and in large numbers on about the 43rd day.

It will be noted that the unusual peak in bacterial numbers in the treated cheese at the 25th day is due partially to a regrowth of streptococci and in part to the appearance of micrococci. It will also be noted, while micrococci did appear in the control cheese, that the predominant flora throughout the test was streptococci. This presents a materially different picture than that found in the treated cheese where all three types of bacteria (streptococci, micrococci and lactobacilli) were the predominant flora in various periods of the test. It may well be that the unexpectedly early appearance of the micrococci and lactobacilli in the treated cheese plays an important part in accelerating the rate of ripening. This is indicated as it is known that various types of chemicals including salts, esters, aldehydes, acids, ketones, alcohols, etc., are produced during the metabolism of the micro-organisms and that the biological activities of the various types of bacteria are factors in producing many characteristics associated with well-ripened cheese.

The mechanisms which stimulate bacterial growth and alter the normal sequence of bacterial development are not fully understood, although it may be due in part to a more favorable pH in the treated cheese. Five samples of treated cheese curd, for example, after aging for a few weeks were found to have pH values within the range of 5.4–5.5 while the five control samples were found to be more acidic and to have pH values within the range of 5.1–5.2. The cavitation effect, i.e. formation of tiny cavities in the rarefactions left behind the compressional waves, may also have some direct or indirect effect which influences bacterial growth.

The changes which produce a softer, more plastic and more soluble curd during aging are largely attributed to hydrolysis of the protein, and the extent of these changes is usually determined by measurement of the increase in water-soluble nitrogen. While this in itself is not a complete index of cheese quality or flavor, investigations have demonstrated that Cheddar cheese treated with compressional waves in accordance with the present invention and aged for six weeks, has about the same percentage of water-soluble nitrogen present as is found in untreated controls aged for about four and one-half months.

Besides proteolysis, investigations further indicate that other chemical reactions are speeded up as the compressional wave vibrations bring together reactive molecules. It appears, for example, that the waves have a direct effect on acids particularly the alpha hydroxy acids such as lactic acid and citric acid present in the cheese, as treated cheese aged for a few weeks has been found to possess less of the unwanted acid taste present in the untreated controls. Experiments with N/10 lactic acid in this connection have shown the titratable acidity to be decreased with a corresponding increase in reducing compounds, e.g. aldehydes, after treatment with compressional waves. Reducing compounds have aromatic odors and are known to be decidedly more flavorable than acids such as lactic acid. It is also possible that the reducing compounds liberated by the waves react in situ with other constituents of the complex cheese mixture to form still more flavorful components. It is also possible that the compressional waves modify the butter fat present in the curd or cheese. This is indicated as samples of butter oil subjected to ultrasonic waves for 10 and 20 minutes were found to take on an improved aromatic type flavor and to be modified chemically as evidenced by the decrease in both acid and iodine numbers originally present in the butter oil.

The following examples utilizing the apparatus shown in Figure 1, will serve to illustrate the present invention.

EXAMPLE I

A piece of unripened (green curd) milk Cheddar cheese 10 about 2" thick is first placed in glass container 11 and the container is then suspended by a adjustable clamp 12 into oil bath 13 above the piezoelectric crystal 14 of the compressional wave apparatus. The radio-frequency oscillator 15 is then tuned by knobs 16 and 16' to the crystal frequency and maximum power of about 500 watts is applied with an energy transfer into the curd of about 25 watt hours per pound of curd. The vibrating crystal used in this example sends out compressional waves of about 450 kilocycles per second which strike the bottom of the container and are transmitted through to the cheese. Maximum transmission of the sound energy into the cheese being treated is achieved when the distance between the container 11 and the crystal 14 is such that the reflection of the sound waves from the bottom of the container 11 is minimized. This distance may be readily determined by raising or lowering the container in the oil bath and observing the effect of this movement upon the meters 17 and 17' on the oscillator which measure the plate and grid currents, respectively. When the sound waves are reflected from the container, there is a dampening effect upon the vibration of the crystal 14 which effect is reflected into the electrical circuit of the oscillator, thereby causing the meter readings of the plate and grid currents to vary. Minimum reflectance or the maximum transmission of the sound energy into the cheese is obtained when the readings of the plate and grid current are at a maximum.

The oil circulating pump 20 is turned on at this point and the oil is circulated out of the oil bath surrounding the crystal as shown at 21 through refrigerated coil 22 cooled in refrigerating tank 23 and back into the bath as shown at 24. During the operation of the compressional wave apparatus, the refrigerating coil carries off the heat generated by the compressional waves and maintains the oil and cheese at a substantially constant temperature of about 70° F.

The operation of the compressional wave apparatus is continued for about ten minutes and then the treated cheese is stored at 45° F. At the end of six weeks, tests have demonstrated the treated cheese to have a body and flavor far superior to untreated controls and comparable to untreated controls stored under similar conditions for four to five months.

EXAMPLE II

The container 11 is first filled with fresh curd immersed in whey at the time the curd is ready for the dipping operation in the manufacture of cheese. Just enough whey is used to suspend the curd and minimize matting of the particles. The container is then suspended in the oil bath above the piezoelectric crystal and the oscillator tuned as in Example I. The vibrating crystal used in this example sends out compressional waves of about 400 kilocycles per second which are transmitted to the curd. Maximum transmission of the sound energy to the curd is achieved by raising or lowering the container in the oil bath as in Example I.

The oil circulating pump is turned on and the oil is circulated as in Example I. During the operation of the compressional wave apparatus, the temperature of the oil, however, is controlled so that the temperature of the curd and whey will be maintained at about 95–102° F. The curd should also be kept within this temperature range throughout handling so that the cheese making operations following dipping may proceed in the normal manner.

The operation of the compressional wave apparatus is continued for about ten minutes after which the whey is drained off and the usual cheese making procedure resumed. At the end of six weeks' storage at about 40° F., cheese made from the treated curd was found to have the desired waxy-like texture and to have greater cheese flavor of the type desired than controls stored under similar conditions for 3 to 4 months.

When curd or cheese is treated as in Example I and the medium surrounding the cheese or curd is air, we have discovered that a very thin film of milk fat tends to form during the compressional wave treatment between the bottom of the curd or cheese and the container. While transmission of the waves to the cheese may in part be direct or through air due to the presence of air pockets on the bottom of the cheese, the film of milk fat may also act as the transmission medium during part of thte treatment. When curd suspended in whey is treated as in Example II, the whey acts as the medium for transmitting the waves to the curd.

EXAMPLE III

A barium titanate piezoelectric crystal is placed between and in direct contact with the flat surfaces of two one-day old Cheddar cheeses which are stacked one on top of the other. A film of butter oil between the cheese and the crystal is employed to give a good acoustical contact. The generator-transducer circuit is tuned to resonance at about 400 kilocycles and the cheeses are allowed to absorb the emitted compressional waves for about one minute. The power is turned off, and the cheeses are prepared for cold storage.

At the end of six weeks, tests have demonstarted the treated cheese to have a body and flavor far superior to untreated controls and comparable to untreated controls stored under similar conditions for four to five months.

EXAMPLE IV

In accordance with Example III, two Gouda cheeses were treated for about one minute at about 400 kilocycles per second. The treated cheese was marketable in about 30 days compared with normal ripening time of about 90 days.

The method of the present invention may be used to advantage with cheese curd employed in the manufacture of all types of cheese, including natural cheese and the so-called filled cheese products made with substitute fats, e.g. vegetable fats. In practice it has been found particularly adaptable for use in treating cheese curd employed in the manufacture of the various types of Cheddar and Swiss and Brick cheese, as well as Gouda and Edam types of cheese. With cheese of these types the method of the present invention makes it possible to obtain superior cheese with the desired consistency or body texture and greater intensity of cheese flavor in about one-half the ripening periods employed heretofore. The method of the present invention may also be used to improve the flavor of all types of cheese including cheese products known in the art as processed cheese and cheese foods.

The compressional wave treatments of the present invention, as indicated above, may be applied to cheese or cheese curd products generally including partially ripened curd, green curd, fresh curd suspended in whey, etc. Various combination treatments may also be employed. These include treatment of the fresh curd suspended in whey, followed by a treatment of the green curd prepared from the treated fresh curd when in finished form for ripening, and then followed by a treatment of the treated green curd when partially ripened, or an initial treatment of the fresh curd followed by a subsequent treatment of the resulting green curd or partially ripened curd, or an initial treatment of the green curd followed by a subsequent treatment of the resulting partially ripened green curd. In addition to the above variations, multiple treatments may be used in the various operations, as, for example, the treatment of partially ripened curd after two days and again after four days, etc. The green curd or partially ripened curd may also be treated with compressional waves in accordance with the present invention after it has been wrapped, for example, in coated cellophane, Pliofilm, plastic film or metal foil and the like, as is done during conventional methods of handling cheese for storage and sale.

EXAMPLE V

In accordance with Example III two Pliofilm wrapped one-day old Cheddar cheeses were treated for about one minute at about 400 kilocycles per second. This procedure is one of the preferred for commercial operations.

In the above examples and similar type experiments, the energy input was at least 0.05 and usually within the range of about 0.1 to 1.0 watt hours per pound of curd. More energy input up to about 25 watt hours per pound of curd or cheese can be employed as indicated above, if desired.

The curd used in the present invention may be made from raw or unpasteurized milk or from pasteurized milk. Investigations in this connection show that cheese made from curd made from pasteurized milk and treated with compressional waves in accordance with the present invention, not only ripens at a more rapid rate but it also acquires the desirable flavor normally associated with a high quality cheese made from raw milk. This is important as it makes it possible to take advantage of the safety factor involved in the use of pasteurized milk and at the same time achieve some of the desired flavors characteristic of cheese products made from raw or un-pasteurized milk.

The present invention provides means for accelerating (a) the liberation or formation of amino acids from the protein material and (b) the growth of bacteria in the ripening curd. This is illustrated in Table I above, which shows that the compressional waves accelerate the liberation of desired amino acids such as glutamic acid and leucine, and by Figure 2 which shows that the compressional waves accelerate the growth of bacteria in the curd during a portion of the aging or ripening period. Table II above, gives the percent of bacterial types, the untreated or control sample having a bacterial count of about $15 \times 10^6$ at the peak between the 25th and 30th days, and the treated sample having a count of about $62 \times 10^6$ or more than four (4) times as many bacteria at the peak around the 25th day.

It will be understood that the apparatus shown in the drawing is for illustrative purposes only. The curd or cheese as explained above may be in direct contact with the transducer. Also, in a continuous process the apparatus may be arranged so that pairs of cheeses are brought by means of a conveyor along either side of a suitably arranged transducer. When in the proper position, the cheeses are held tightly against the transducer and are treated for a short time. The conveyor then removes the treated cheeses and brings another pair of untreated cheeses into position for treatment. An intermittently moving chain conveyor with glass or metal containers may also be employed. In a preferred commercial set up for a continuous operation, curd suspended in whey is pumped slowly through a channel or conduit which passes through the treatment zone or zones. The optimum conditions for treating the cheese curd or cheese will vary somewhat with the compressional wave apparatus used and the method of treatment employed, but may be readily ascertained by preliminary experimental test.

The present application is a continuation-in-part of our prior application, Serial No. 125,704, filed November 5, 1949, now abandoned, and is also a continuation-in-part of our prior application, Serial No. 336,304, filed February 11, 1953, now abandoned.

We claim:

1. A method for accelerating the ripening of cheese which comprises subjecting cheese curd to compressional waves having a frequency of about 100 to 100,000,000 cycles per second with an energy input of at least about 0.05 watt hour per pound of curd, and then curing the treated curd.

2. A method in accordance with claim 1 where the curd is suspended in whey.

3. A method in accordance with claim 1 where the curd is green cheese curd.

4. A method in accordance with claim 1 where the curd is partially ripened cheese curd.

5. A method in accordance with claim 1 where the curd is wrapped in a wrapper.

6. A method for accelerating the ripening of cheese which comprises subjecting the cheese curd to ultrasonic compressional waves with an energy input of at least about 0.05 watt hour per pound of curd, and then curing the treated curd.

7. A method for accelerating the ripening of cheese which comprises subjecting cheese curd to ultrasonic compressional waves having a frequency of about 200,000 to 1,000,000 cycles per second with an energy input of about 0.1 to 1.0 watt hour per pound of curd, and then curing the treated curd.

8. A method in accordance with claim 7, where the curd is Cheddar cheese curd.

9. In the manufacture of Cheddar cheese, the improvement which comprises subjecting Cheddar cheese curd to compressional waves having a frequency of about 200 to 1,000 kilocycles per second with an energy input of at least about 0.05 watt hour per second of curd, cooling the cheese curd during the treatment so as to maintain the curd at a temperature of about 70° F., and then curing the treated cheese curd.

10. In the manufacture of Cheddar cheese, the improvement which comprises subjecting fresh cheese curd suspended in whey prior to the dipping operation to compressional waves having a frequency of about 200 to 1,000 kilocycles per second with an energy input of at least about 0.05 watt hour per pound of curd, maintaining the temperature of the curd and whey at about 95 to 102° F. during said treatment, and thereafter curing Cheddar cheese made from the treated curd.

11. In the ripening of cheese, the improvement which consists in accelerating the growth of bacteria and the liberation of amino acids in cheese by subjecting cheese curd to compressional waves having a frequency of about 200,000 to 1,000,000 cycles per second with an energy input of at least about 0.1 watt hour per pound of curd and thereafter curing the treated curd.

References Cited in the file of this patent

UNITED STATES PATENTS

| 2,598,374 | Havens et al. | May 27, 1952 |
| 2,606,122 | Stark | Aug. 5, 1952 |

FOREIGN PATENTS

| 830 | Australia | Mar. 3, 1926 |
| 1,592 | Australia | Apr. 13, 1956 |

OTHER REFERENCES

Food Industries, November 1948, p. 149.
The Chemical Age, Apr. 9, 1949, p. 521.
J. Dairy Science, vol. 32, No. 9 (1949), p. 792.
U.S. Dept. of Agriculture Bulletin 49, 1903 ("The Cold Curing of Cheese"), pp. 11 and 36.